(12) United States Patent
Browning

(10) Patent No.: US 7,298,957 B2
(45) Date of Patent: Nov. 20, 2007

(54) METHOD FOR CONTROLLING SAGGING OF A POWER TRANSMISSION CABLE

(75) Inventor: Raymond Browning, San Carlos, CA (US)

(73) Assignee: Gift Technologies, LP, Redondo Beach, CA (US)

( * ) Notice: Subject to any disclaimer, the term of this patent is extended or adjusted under 35 U.S.C. 154(b) by 0 days.

(21) Appl. No.: 11/485,165

(22) Filed: Jul. 11, 2006

(65) Prior Publication Data

US 2007/0009224 A1 Jan. 11, 2007

Related U.S. Application Data

(60) Provisional application No. 60/698,429, filed on Jul. 11, 2005.

(51) Int. Cl.
*G02B 6/00* (2006.01)
*G01R 19/00* (2006.01)

(52) U.S. Cl. ................... 385/147; 324/76.11; 324/106; 324/127

(58) Field of Classification Search ..................... None
See application file for complete search history.

(56) References Cited

U.S. PATENT DOCUMENTS

| | | |
|---|---|---|
| 3,184,535 A | 5/1965 | Worthington |
| 3,324,233 A | 6/1967 | Bryant |
| 3,717,720 A | 2/1973 | Snellman |
| 3,903,354 A | 9/1975 | Dageforde |
| 3,983,313 A | 9/1976 | Ney et al. |
| 4,422,718 A | 12/1983 | Nakagome et al. |
| 4,441,787 A | 4/1984 | Lichtenberger |
| 4,449,012 A | 5/1984 | Voser |

(Continued)

FOREIGN PATENT DOCUMENTS

EP 1124235 A2 8/2001

(Continued)

OTHER PUBLICATIONS

Information on Substances; Publication on Kemi Swedish Chemical Inspectorate web-site; http://www.kemi.se/kemamne_eng/kolofonium_eng.htm; 1994; 2 pages.

(Continued)

*Primary Examiner*—Tina M. Wong
(74) *Attorney, Agent, or Firm*—Christie, Parker & Hale, LLP.

(57) ABSTRACT

A method is provided for controlling the sagging of a power transmission cable hang between two towers. The cable has a first supporting portion and a second conductive portion. The method includes a first act of mounting the cable between the two towers, such that when mounted between the towers the cable has a cable load. The method further includes a second act of stretching the first portion to have a cable sag less than a desired sag, a third act of releasing at least some of the tension to obtain the desired sag, and a fourth act calculating a load magnitude carried by the first portion. If the load magnitude is less than a desired load magnitude the method includes repeating the second, third and fourth acts until the load magnitude is at the desired level.

20 Claims, 4 Drawing Sheets

U.S. PATENT DOCUMENTS

| | | | |
|---|---|---|---|
| RE32,374 E | 3/1987 | Dey et al. | |
| 4,690,497 A | 9/1987 | Occhini et al. | |
| 4,770,489 A | 9/1988 | Saito et al. | |
| 4,793,685 A | 12/1988 | Taylor et al. | |
| 4,861,621 A | 8/1989 | Kanzaki | |
| 4,966,434 A | 10/1990 | Yonechi et al. | |
| 5,082,379 A | 1/1992 | Lindner et al. | |
| 5,222,173 A | 6/1993 | Bausch | |
| 5,304,739 A | 4/1994 | Klug et al. | |
| 5,517,864 A * | 5/1996 | Seppa | 73/862.391 |
| 5,626,700 A | 5/1997 | Kaiser | |
| 5,808,239 A | 9/1998 | Olsson | |
| 5,918,288 A * | 6/1999 | Seppa | 73/862.391 |
| 6,676,090 B1 * | 1/2004 | Eslambolchi et al. | 248/49 |
| 7,015,395 B2 | 3/2006 | Goldsworthy et al. | |
| 7,019,217 B2 | 3/2006 | Bryant | |
| 7,041,909 B2 | 5/2006 | Hiel et al. | |
| 7,060,326 B2 | 6/2006 | Hiel et al. | |
| 2004/0026112 A1 | 2/2004 | Goldsworthy et al. | |
| 2004/0131834 A1 * | 7/2004 | Hiel et al. | 428/292.1 |
| 2004/0131851 A1 | 7/2004 | Heil et al. | |
| 2004/0182597 A1 | 9/2004 | Smith et al. | |
| 2005/0129942 A1 | 6/2005 | Hiel et al. | |
| 2005/0186410 A1 | 8/2005 | Bryant et al. | |
| 2005/0227067 A1 | 10/2005 | Hiel et al. | |
| 2006/0051580 A1 | 3/2006 | Bryant et al. | |

FOREIGN PATENT DOCUMENTS

| | | |
|---|---|---|
| GB | 2262646 A | 6/1993 |
| JP | 49-83881 A | 8/1974 |
| JP | 9-102221 A | 4/1997 |
| WO | WO 03/091008 A1 | 11/2003 |
| WO | WO 2005/040017 A2 | 5/2005 |
| WO | WO 2005/040017 A3 | 5/2005 |
| WO | WO 2005/041358 A3 | 6/2005 |

OTHER PUBLICATIONS

Development of a Composite Reinforced Aluminum Conductor; Inventions & Innovation Project Fact Sheet; Nov. 1999; 2 pages; Office of Industrial Technologies Energy Efficiency and Renewable Energy, U.S. Department of Energy, Washington D.C., United States.

* cited by examiner

METHOD FOR CONTROLLING SAGGING OF A POWER TRANSMISSION CABLE

CROSS-REFERENCE TO RELATED APPLICATION(S)

This application is based upon and claims priority on U.S. Provisional Application No. 60/698,429 filed on Jul. 11, 2005, the contents of which are fully incorporated herein by reference.

TECHNICAL FIELD

The present invention relates generally to electrical power transmission, and more particularly to a high temperature bare conductor cable with an elastic or composite supporting core for electrical power transmission lines and a method for tensioning the conductor cable, and still more particularly to a conductor cable incorporating a composite supporting core with a low temperature coefficient of expansion, and still more particularly to a tensioning method for a composite core cable that reduces the sag induced in the cable by thermal expansion.

BACKGROUND INFORMATION AND DISCUSSION OF RELATED ART

Electrical cables used in high voltage overhead transmission lines are typically bare conductors of aluminum with a central core of steel to give strength and durability to the relatively weak aluminum conductor. These cables are termed Aluminum Conductor Steel Reinforced (ACSR) or Aluminum Conductor Steel Supported (ACSS) cables. These cables are produced in over seventy standard sizes and are generally code named after North American birds such as Linnet, Drake, Cardinal, and Joree. FIG. 1 is an illustration of a bare conductor cable 100. A multiplicity of aluminum conductor wires 101 are stranded around a central support core 102 which is also a stranded cable with between typically 7 and 19 steel wires.

Advanced composite technologies such as glass and carbon fiber, and metal matrix composites are possible replacements for steel in the supporting core. The rationale for replacing the steel with a composite core is to give better qualities to the transmission line system. In particular replacing the steel core with glass and carbon fiber composites is intended to give a lower temperature coefficient of expansion for the cable. A low temperature coefficient of expansion is important because when the overhead conductor carries a high current load the cable becomes hot and the cable expands. When the cable expands the sag between the support towers increases. When bare conductor cables are strung from the support towers they are designed to have a sag that is safely above the surrounding topography including trees and buildings under conditions of high current high temperature operation. The process of setting the tension and the sag of the conductors is called sagging. The lower the thermal expansion, and the smaller the change in the sag of the line under high load, the more economic it becomes to run at higher line voltages and currents as the safety margins are greater.

A sagging of a cable in a transmission line is illustrated in FIG. 2. The sagged cable 201 is supported between towers 202a and 202b above the terrain 203. The sag, D, 204, is set by changing the tension in the line. The sag, D, 204 is approximately related to the horizontal tension, H, 205, the span of the cable, S, 206, and the weight per unit distance of the cable, w, by the equation:

$$D = H/w \ [cosh(wS/2H)-1] \quad (1)$$

which is approximated by the equation:

$$D = wS^2/8H \quad (2)$$

These equations are called the catenary equations.

As the conductor heats up with increased current flow the cable expands and the tension in the cable decreases. As the horizontal tension, H, 205 decreases the sag D 204 increases. The increased sag means that the cable might contact trees or buildings under the cable, i.e., transmission line and the transmission line towers must be tall enough to prevent this happening.

The chosen cables must also have sufficiently high ultimate tensile strength to meet safety factors under conditions of high winds and winter icing in geographical areas that experience these conditions. Also the sag of the cable under these conditions must also not be large.

Glass fiber and Carbon fiber support cables are typically pultruded using a variety of resin binders. These cables can have a variety of shapes and compositions. These cables typically have a lower coefficient of thermal expansion than a steel cable. Steel has a coefficient of thermal expansion of approximately 10 ppm per degree Centigrade while E-CR glass has a coefficient of thermal expansion of 6 ppm and Carbon composite has a coefficient of thermal expansion less than 1 ppm.

Composite supporting cores using glass and carbon fibers have been proposed for a number of years and a commercial version of the technology is being marketed with carbon fibers. The quoted advantages of the composite core support are higher ultimate strength, lower thermal coefficient of expansion, and lower weight. However, composite core technology has a number of difficulties that have slowed the technology's acceptance into the mix of technology solutions available to the utility companies.

Among these difficulties is the low modulus of elasticity of the supporting cores. The low modulus of elasticity is particularly true for glass fiber based cores. Glass fibers have a lower modulus of elasticity than the steel used in ACSS. When glass fibers are combined with resin in a composite core, the resulting modulus of elasticity can be less than a third of that of steel.

Thus it would appear to those skilled in the art that apart from the higher ultimate strength and the lower thermal coefficient of expansion the low modulus of elasticity can seriously undermine the value of the composite technologies, particularly the value of glass fiber. Indeed the low modulus of elasticity for a glass fiber core suggests that to get to the higher ultimate strength of core the sag on a transmission line would be unacceptably large.

SUMMARY OF THE INVENTION

It is an exemplary embodiment of the invention, a bare conductor cable and method for stringing the same to have a low sag with temperature and a lower cost are provided. In one exemplary embodiment, a bare conductor cable with a composite core is provided. The core has a lower modulus of elasticity than an equivalent core made from steel. Using a tensioning method, most of the initial tension during stringing and sagging operations is placed onto the core.

In another exemplary embodiment, a method for controlling the sagging of a power transmission cable hang between the two towers is provided. The cable has a composite portion and a conductive portion. The method includes a first act of mounting the cable between two towers, such that when mounted between the towers said cable has a cable load, a second act of stretching the cable to have a sag less than a desired sag, a third act of releasing at least some of the tension to obtain the desired sag, wherein the act of releasing allows the composite portion to compress more than the conductive portion, and a fourth act of calculating a load magnitude carried by the composite portion. If the load magnitude is not at least 50% of the cable load, the method includes repeating the second, third and fourth acts until the load magnitude is at least 50% of the cable load. In another exemplary embodiment, if the load magnitude is not at least 75% of the cable load, the method includes repeating the second, third and fourth acts until the load magnitude is at least 75% of the cable load.

In yet a further exemplary embodiment, the composite portion is a composite core and the conductive portion surrounds the composite portion. The composite portion may include a material selected from the group consisting of glass fibers and carbon.

In a further exemplary embodiment, a method for controlling the sagging of a power transmission cable hang between two towers is provided. The cable has a first supporting portion and a second conductive portion. The method includes a first act of mounting the cable between the two towers, such that when mounted between the towers the cable has a cable load. The method further includes a second act of stretching the first portion to have a cable sag less than a desired sag, a third act of releasing at least some of the tension to obtain the desired sag, and a fourth act calculating a load magnitude carried by the first portion. If the load magnitude is less than a desired load magnitude the method includes repeating the second, third and fourth acts until the load magnitude is at the desired level.

In one exemplary embodiment, the desired load magnitude is greater than 50% of the cable load. In another exemplary embodiment, the desired load magnitude is not less than 75% of the cable load. In yet another exemplary embodiment stretching includes stretching the first and second portions of the cable. In an exemplary embodiment, releasing at least some of the tension allows the first portion to compress more than the second portion. In another exemplary embodiment, the second portion includes aluminum, and stretching stretches the aluminum, and releasing at least some of the tension allows the first portion to compress more than the second portion. In another exemplary embodiment, the second portion surrounds the first portion. The second portion may include a composite material, which in exemplary embodiments may include glass fibers or carbon. In one exemplary embodiment, the first portion forms a core of the cable. In yet another exemplary embodiment, the first portion surrounds the second portion.

In yet a further exemplary embodiment, the first portion has a modulus of elasticity that is smaller than the modulus of elasticity of steel, and may have a coefficient of thermal expansion that is lower than a coefficient of thermal expansion of steel. In another exemplary embodiment, the first portion has a modulus of elasticity that is smaller than a modulus of elasticity of the second portion, and may have a coefficient of thermal expansion that is lower than a coefficient of thermal expansion of the second portion.

DETAILED DESCRIPTION OF THE INVENTION

Figure 1:
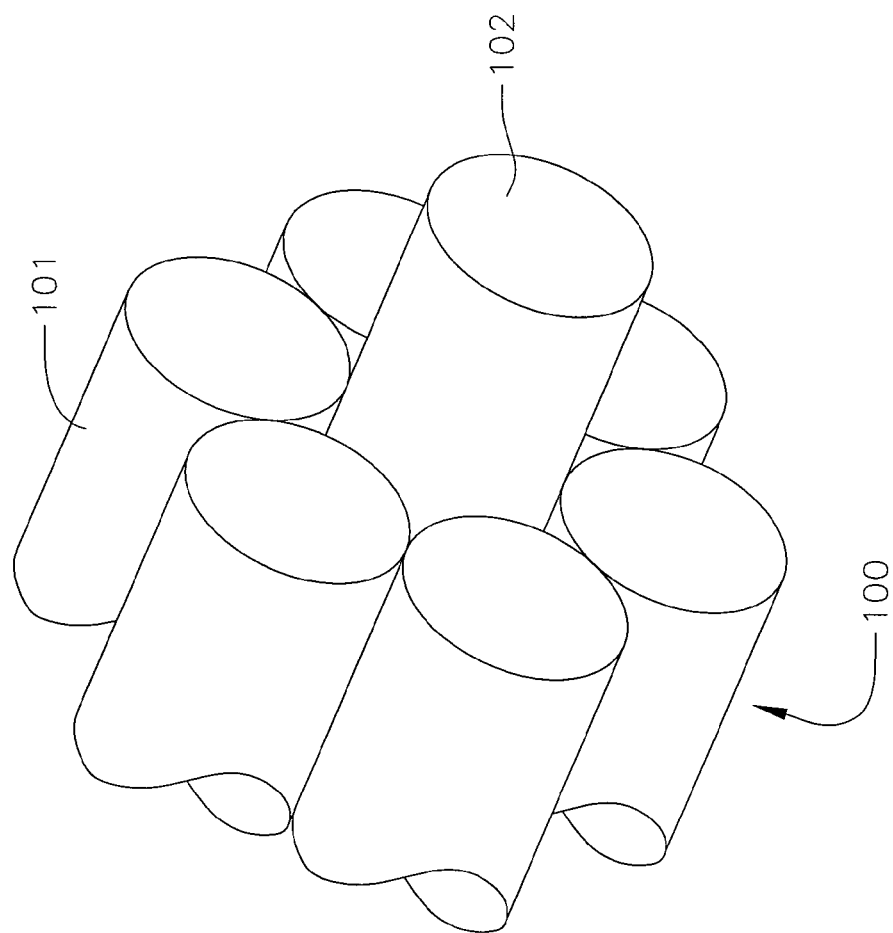
FIG. 1 is a partial illustration of a bare conductor cable with a support core.
Figure 2:
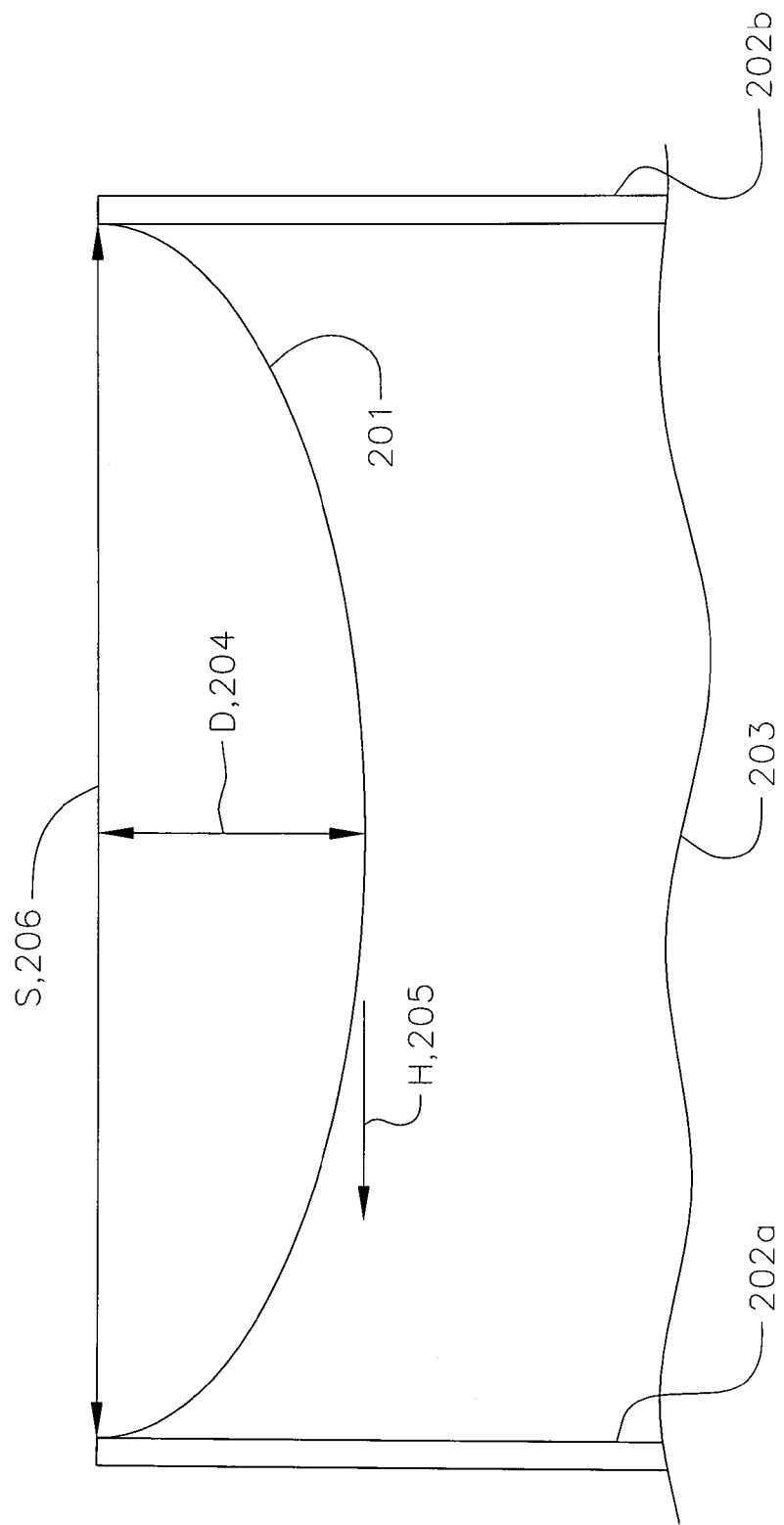
FIG. 2 is a schematic of the sag of a transmission line over terrain.

In FIGS. 1 through 4, like reference numerals refer to like components in the various views.

Composite core technologies such as glass fiber and carbon fiber in resin have a number of advantages for use as a conductor support core. These advantages include, among other things, low thermal expansion, low weight, low creep, high internal damping, high elasticity, high corrosion resistance, and high ultimate tensile strength.

Glass fiber also has the advantage that it is of a similar cost to steel while carbon is more expensive. Thus, a high ampacity high temperature glass fiber composite supported cable, Aluminum Conductor Composite Supported, ACCS, cable having a glass fiber composite will enable a transmission system with greater ground clearance under high current load, high resistance to Aeolian vibration, and longer life, for no extra cost.

In an exemplary embodiment, the invention is characterized by a bare conductor cable with a composite core. The core has a lower modulus of elasticity than an equivalent core made from steel. In another exemplary embodiment, a tensioning method is provided that puts most, and in an exemplary embodiment more than 75%, of the initial tension during stringing and sagging operations onto the core.

When designing a transmission system with a steel supported cable, ACSS, the focus is on the strength of the cable under adverse conditions. When designing a transmission line with glass fiber supported cable, ACCS, the focus is on the elastic properties of cable under different temperature conditions.

As an illustration of the potential for high temperature operation of ACCS with a low modulus core, the effect of replacing the Joree ACSS steel core with an advanced resin E-CR glass fiber core of the same diameter is calculated. E-CR is corrosion resistant, low boron, glass. Joree is an Al conductor steel core cable with an ampacity of 1759.0 Amps at 75° C. when used as ACSR, and 3390.0 Amps at 200° C. when used as ACSS. The Rated Strength for ACSR is 60,200 lbs and for ACSS is 38,700 lbs. Metal content by weight for each of the ACSS and ACSR is 86.7% Al and the cross sectional area for each is 95% Al.

In one exemplary embodiment, the strength and elasticity of the aluminum conductor is not a large factor in determining the initial sagging tension at ambient temperature. However, in another exemplary embodiment, the strength and elasticity of the aluminum conductor should ensure that during initial sagging that more than 75% of the weight of the aluminum is carried by the support core. This can be achieved by either pre-tensioning the full cable after it is supported and clamped or by pre-tensioning the core and then clamping the aluminum onto the core. It will be obvious to those skilled in the art that there are alternative methods of ensuring the load is carried by the core and that both during initial stringing and at high temperature operation the core strength and elastic properties dominate. In another exemplary embodiment, the core is strung, pre-stressed, and sagged to take the load with the aluminum as dead weight.

Using an elastic vs. catenary plot for line sag on a 1000 ft level span with an initial tension of 9000 lbs borne by the cable cores, the sag is slightly lower using the glass fiber core due to the weight difference of the cables, 2.507 lbs/foot for ACCS compared with 2.745 for the ACSS.

Figure 3:
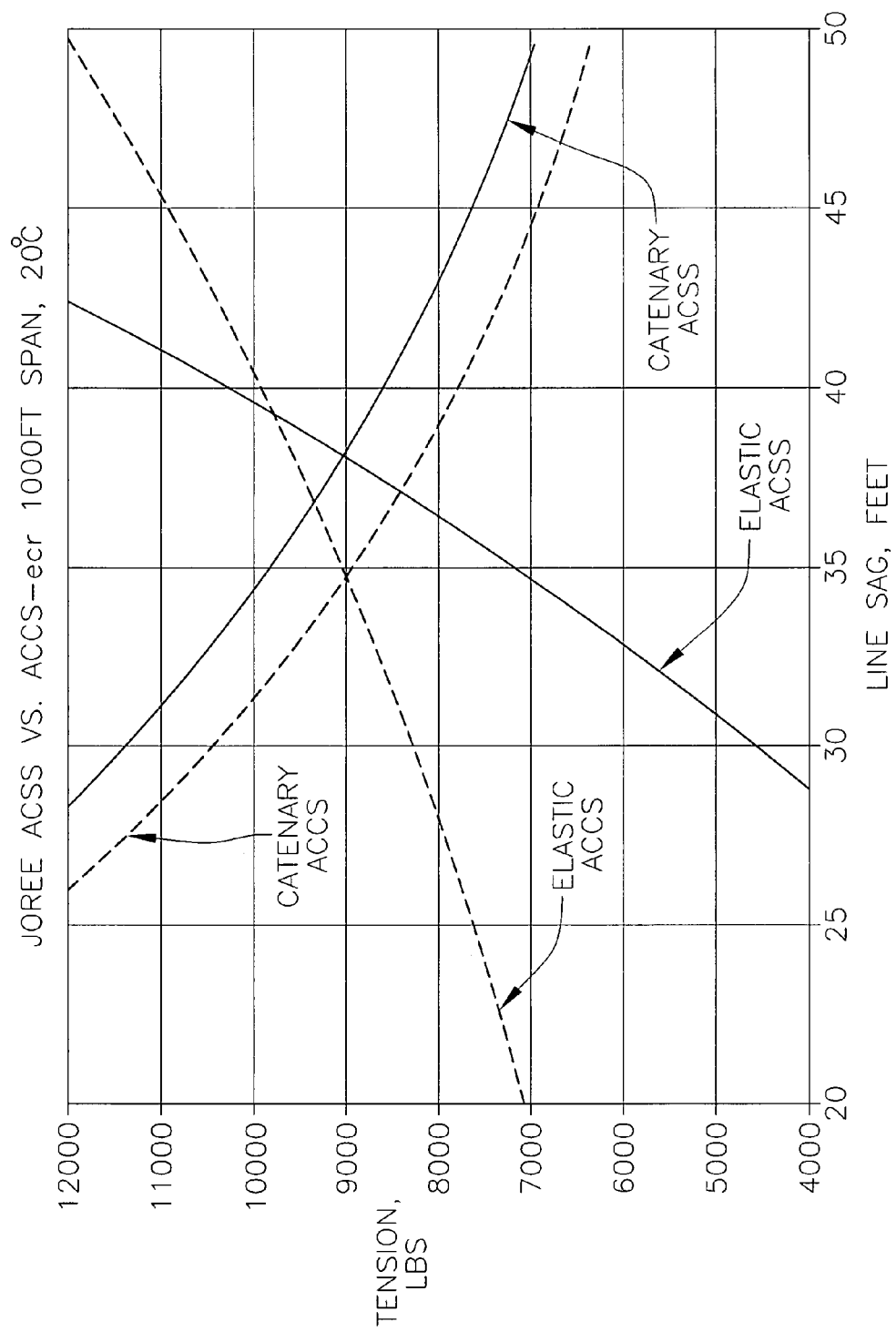
FIG. 3 is a Tension vs. Sag plot for Joree ACSS and ACCS at 20° C.
Figure 4:
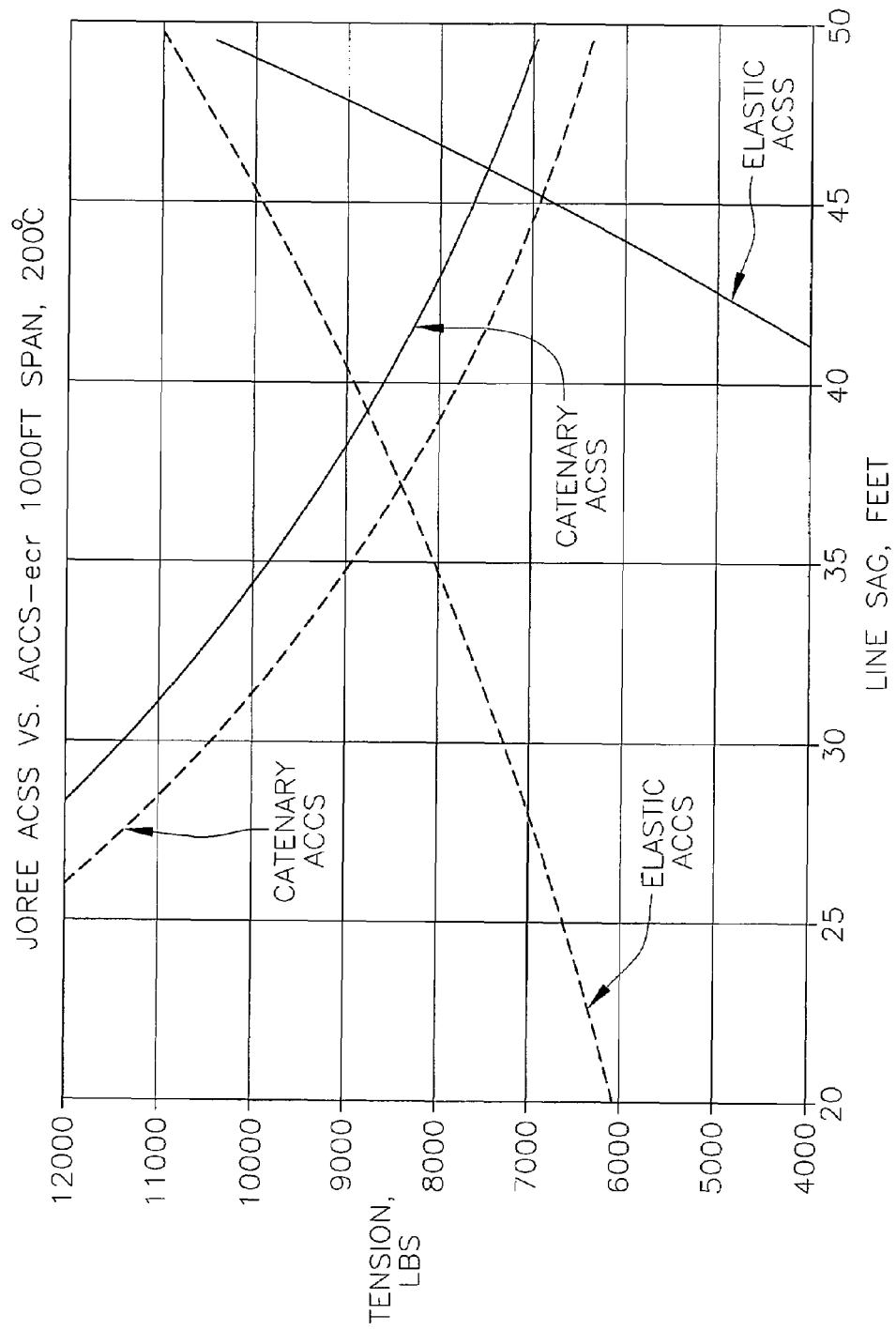
FIG. 4 is an Tension vs. Sag plot for Joree ACSS and ACCS at 200° C.

The plots shown in FIG. 3 and FIG. 4 s are based on calculations of the sag. They are presented as sag versus tension plots. These plots use equation 1, the catenary equation and the elastic equation 3:

$$e = mT \quad (3)$$

Where, e is the extension of the cable due to the tension T on a cable with elastic modulus m. Nominal values of 200 MPa and 50 MPa for the elastic moduli of the steel and glass fiber cores were used respectively in calculating these plots.

The solution for the sag, i.e., the amount of sag, is where the elastic and catenary equations intersect for the different cables.

As shown in FIG. 3, with a 9000 lb stringing tension at 20° C. the initial sag for the ACCS is approximately 35 ft while the sag for ACSS is 38 ft as shown by the intersection of the catenary and elastic equations.

Taking the temperature to 200° C. relaxes the cable and the sag increases. The thermal expansion of the glass core is half that of the steel core but because the elasticity of the glass core is greater it takes up part of the slack as the tension decreases reducing the sag of the glass core compared to the steel core even further. This means that the ACCS sag only increases by 2 ft to 37 ft while the ACSS sag increases four times as much to 46 ft. This is shown in FIG. 4.

With a 70 mph side wind loading at 20° C., calculations reveal that the two cables are substantially identical at a total sag of approximately 40 ft and a vertical sag of 37-38 ft. At 200° C. the vertical sags for ACCS and ACSS are 40 ft and 44 ft respectively. As the ACCS can be strung at a higher initial tension than the steel cored cable, and as ACCS has good internal damping the problem of Aeolian vibration at higher tension need not be a concern and sag can be reduced further.

At low temperatures with ice loading it is expected that the modulus of elasticity of both the types of cables to be heavily influenced by the aluminum given that for Joree there is 10:1 difference in area between the aluminum and the core. It is then expect that the ice loading sag for the ACCS would be similar to that for ACSS.

As can be seen, the properties of a composite core conductor are dominated by the modulus of elasticity while the useful properties of a steel supported cable are dominated by the ultimate tensile strength.

Another exemplary embodiment of the present invention includes a bare aluminum cable with a central support core. In an exemplary embodiment, the central support core may be formed from two half rounds of E-CR glass fiber. The cable is strung between multiple transmission line towers and the cable is clamped. The cable is then pre-tensioned by a winch so that the aluminum conductor is stretched. The cable tension is then relaxed to the desired sag and the tension is measured. The load on the core is then calculated from its known modulus. If the tension is such that the load is largely borne (in an exemplary embodiment more than 75% of the load) by the core then the sagging operation is finished. If the weight is still being shared between the core and the aluminum conductor then the process is repeated.

In summary, an exemplary embodiment composite cable is mounted between towers and then the core and the aluminum of the cable are stretched so that the sag is less than desired. Some of the tension is then released to obtain the desired sag. The load on the core is calculated. If the core is not carrying sufficient load, the cable is stretched further so as to further stretch the aluminum. Some of the tension is again released so as to get the desired sag. The load on the core is again calculated. If the load on the core is not sufficient, as for example if the core is not carrying more than 75% of the load, the process is repeated until the core carries sufficient load. When that occurs, the aluminum is stretched sufficiently. In other words, when the aluminum heats up as it carries current, and it loses its load carrying capabilities, there will not be a significant effect on the cable since the composite core is mounted so as to carry most, if not all, of the cable load.

It should be noted that when the tension is released, the core compresses more than the aluminum. In other words, the aluminum remains stretched even after some of the tension is released. Consequently, as the aluminum is further stretched and the tension on the cable is released, more of the load is carried by the core. As discussed, the aluminum is stretched when stretching the entire cable, i.e., the core and the aluminum stretch together or when stretching the core when the aluminum is attached, e.g., clamped onto the core.

In other exemplary embodiments, it is believed that the aluminum may be sufficiently stretched when the core caries more than 50% of the load. Furthermore, the present invention may be used with cables having other conductive materials such as copper instead of aluminum.

In other exemplary embodiments, the composite structure is stretched more than the conductor or is stretched without stretching the conductor until the appropriate load is carried by the conductor.

The exemplary method may be used with cables where the composite structure is external of the conductor, i.e., a composite material surrounds a central conductor. Furthermore, in other exemplary embodiments, the exemplary method may be used with cables have a supporting structure that has a modulus of elasticity that is lower than the modulus of elasticity of steel or that is lower than the modulus of elasticity of the conductor. For example, the instead of a composite material, the supporting structure, e.g., the core is made from another elastic material. In other exemplary embodiments, the conductor portion of the cable may be a conductive material other than aluminum.

Advantages of the present invention over previous systems include the following:
(a) Low sag with temperature rise
(b) High strength
(c) Low cost
(d) Low stiffness, elastic for winding on a drum
(e) High internal damping
(f) Low weight
(g) Low corrosion
(h) Can operate at higher initial tensions
(i) Elastic in severe weather conditions reducing peak line tension The above disclosure is sufficient to enable one of ordinary skill in the art to practice the invention. While there is provided herein a full and complete disclosure of exemplary embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve

What is claimed is:

1. A method for controlling the amount of sagging of a power transmission cable due to a change in an operating environment of said cable, said cable being hung between two towers, the cable having a composite portion and a conductive portion, the method comprising:
   (a) mounting the cable between two towers, wherein when mounted between the towers said cable has a cable load;
   (b) stretching the cable to have a sag less than a desired sag;
   (c) releasing at least some of the tension to obtain the desired sag, wherein said releasing allows the composite portion to compress more than the conductive portion;
   (d) calculating a load magnitude carried by the composite portion; and
   (e) repeating acts (b), (c) and (d) until the load magnitude is at least 50% of the cable load, wherein the greater the magnitude of the cable load carried by the composite portion the lesser the change in the sagging due to said change in said operating environment of said cable.

2. The method as recited in claim 1 wherein if the load magnitude is not at least 75% of the cable load, the method comprises repeating acts (b), (c) and (d) until the load magnitude is at least 75% of the cable load.

3. The method as recited in claim 1 wherein the composite portion is composite core and wherein the conductive portion surrounds the composite portion.

4. The method as recited in claim 1 wherein the composite portion comprises a material selected from the group consisting of glass fibers and carbon.

5. A method for controlling the amount of sagging of a power transmission cable due to a change in an operating environment of said cable, said cable being hung between two towers, the cable having a first supporting portion and a second conductive portion, the method comprising:
   (a) mounting the cable between the two towers, wherein when mounted between the towers said cable has a cable load;
   (b) stretching the first portion to have a cable sag less than a desired sag;
   (c) releasing at least some of the tension to obtain the desired sag;
   (d) calculating a load magnitude carried by the first portion; and
   (e) repeating acts (b), (c) and (d) until the load magnitude is at the desired level wherein the greater the magnitude of the cable load carried by the first portion, the lesser the change in the sagging due to said change in said operating environment of said cable.

6. The method as recited in claim 5 wherein the desired load magnitude is greater than 50% of the cable load.

7. The method as recited in claim 5 wherein the desired load magnitude is not less than 75% of the cable load.

8. The method as recited in claim 5 wherein stretching comprises stretching the first and second portions of the cable.

9. The method as recited in claim 8 wherein the second portion comprises aluminum, wherein stretching stretches the aluminum, wherein releasing at least some of the tension allows the first portion to compress more than the second portion.

10. The method as recited in claim 8 wherein releasing at least some of the tension allows the first portion to compress more than the second portion.

11. The method as recited in claim 5 wherein the second portion surrounds the first portion.

12. The method as recited in claim 11 wherein the first portion comprises a composite material.

13. The method as recited in claim 12 wherein the first portion comprises glass fibers.

14. The method as recited in claim 12 wherein the first portion comprises carbon.

15. The method as recited in claim 12 wherein the first portion forms a core of the cable.

16. The method as recited in claim 5 wherein the first portion surrounds the second portion.

17. The method as recited in claim 5 wherein the first portion has a modulus of elasticity that is smaller than the modulus of elasticity of steel.

18. The method as recited in claim 17 wherein the first portion has coefficient of thermal expansion that is lower than a coefficient of thermal expansion of steel.

19. The method as recited in claim 5 wherein the first portion has a modulus of elasticity that is smaller than a modulus of elasticity of the second portion.

20. The method as recited in claim 19 wherein the first portion has a coefficient of thermal expansion that is lower than a coefficient of the thermal expansion of the second portion.

* * * * *